United States Patent [19]

Korting

[11] 4,320,586
[45] Mar. 23, 1982

[54] ROTARY DRUM

[75] Inventor: Reinhard Korting, Ennigerloh, Fed. Rep. of Germany

[73] Assignee: Krupp Polysius AG, Fed. Rep. of Germany

[21] Appl. No.: 98,213

[22] Filed: Nov. 28, 1979

[30] Foreign Application Priority Data

Dec. 11, 1978 [DE] Fed. Rep. of Germany ....... 2853435

[51] Int. Cl.³ .................... F26B 11/02; F26B 25/02
[52] U.S. Cl. ................................ 34/108; 34/121;
366/60; 29/115; 432/103
[58] Field of Search ............... 34/108, 121; 64/4;
366/60, 220; 29/115; 432/103, 104

[56] References Cited

U.S. PATENT DOCUMENTS

| 2,249,831 | 7/1941 | How | 34/108 |
| 2,999,396 | 9/1961 | Kaczmarski | 34/108 |
| 3,561,132 | 2/1971 | La Grone | 34/108 |
| 4,030,878 | 6/1977 | Kunath | 432/103 |

Primary Examiner—Larry I. Schwartz
Attorney, Agent, or Firm—Learman & McCulloch

[57] ABSTRACT

A rotary drum comprising a bearing ring loosely arranged on the drum shell and spacer plates arranged between the ring and the shell, a pair of elements for axially holding a spacer plate in position being provided at one end of each spacer plate, one retaining element being arranged on the drum shell and the other retaining element being arranged on the spacer plate. This construction enables the spacer plates to be readily replaced and the radial clearance to be changed without any need to loosen a retaining element fixed on the drum shell.

12 Claims, 8 Drawing Figures

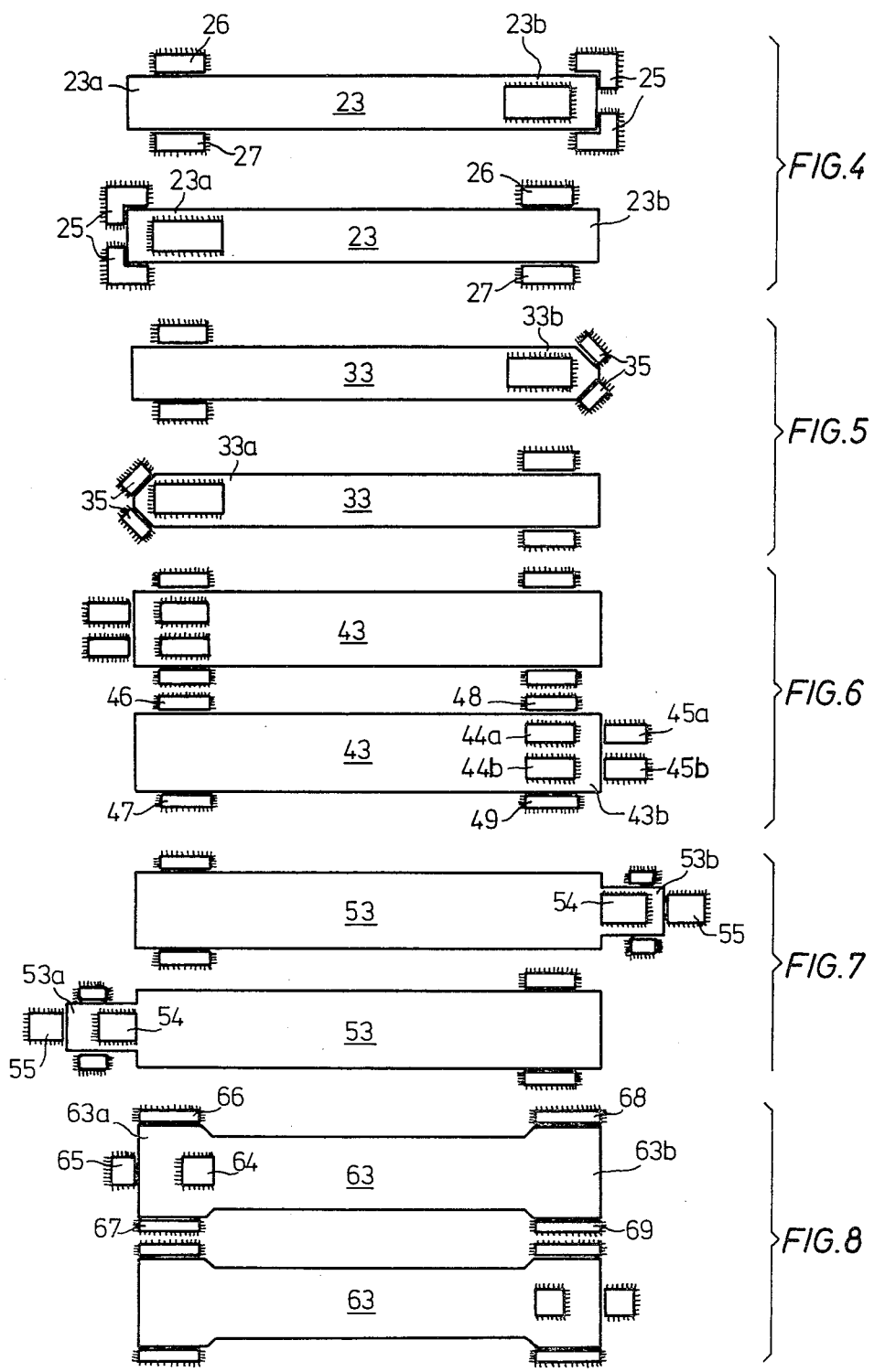

ROTARY DRUM

BACKGROUND OF THE INVENTION

This invention relates to a rotary drum comprising a bearing ring loosely mounted on the drum shell and spacer plates loosely arranged between the drum shell and the bearing ring and which are secured in the axial and peripheral direction of the drum shell by means of retaining elements, but which are displaceable to a limited extent relative to the bearing ring and/or the drum shell, at least in the axial direction.

In rotary drums of the type used for the heat-treatment of bulk materials, for example revolving tubular kilns, drying drums, cooling drums and the like, at least one bearing ring is mounted on the drum shell by means of which the drum shell rests on supporting rollers, at least one bearing ring being loosely arranged on the drum shell so that it does not rotate with the shell. This loose bearing ring has minimal clearance from the outer periphery of the drum shell and has to be guided in the axial direction of the rotary drum. In heat-treatment drums of the type in question, particular importance is attached to the clearance to be maintained between the loose bearing ring and the outer periphery of the drum shell, particularly when considerable fluctuations in temperature occur, as is the case above all with revolving tubular kilns. This is because, if the clearance referred to is too great, the bearing strength of the bearing ring is not fully utilized and serious deformations, particularly in the form of ovalities, can occur in operation with the result that, for example, a lining, refractory cladding or the like provided on the inside of the drum shell is destroyed in the region of this loose bearing ring. If, on the other hand, the clearance referred to is too small, necking of the drum shell can occur in the region of this bearing ring during the heating of a revolving tubular kiln for example and can also result in undesirable deformation of the shell and hence in damage to internal linings of the drum shell.

Various constructions for retaining a loose bearing ring on the drum shell are known in practice. In most cases, spacer plates are used, being inserted between the loose bearing ring and the drum shell. In the event of an excessive change in the clearance from the bearing ring, these spacer plates may be replaced by other spacer plates.

In one known construction, the spacer plates are screwed or welded onto the outside of the drum shell. However, this method of fixing the spacer plates on the drum shell is attended by two serious disadvantages. Since a drum shell is exposed to considerable deformation in operation, a sudden increase in rigidity relative to the drum shell occurs in the region of the spacer plates thus secured which can lead to damage to the spacer plates, to the fixing points and to the drum shell. If, in addition, the spacer plates have to be replaced due to a change in the clearance between the bearing ring and the drum shell, the necessary replacement can only be effected by removing old spacer plates and fitting new ones, both of which involve complicated operations.

In another known construction, an attempt is made to overcome the disadvantages referred to above by loosely arranging the spacer plates between the drum shell and the loose bearing ring and subsequently fixing them with minimal axial clearance from the drum shell and the bearing ring by means of angular retaining elements which are welded onto the drum shell. For securing the loose bearing ring in the axial direction of the drum shell, additional retaining elements or the like are welded onto the drum shell. With this known construction, however, two points have to be borne in mind. Firstly, the spacer plates are rolled down to a certain extent by the bearing ring in operation so that they become longer, this increase in length having to be taken into consideration when establishing the axial clearance by means of the angular retaining elements. Secondly, however, it is important to obtain minimal clearance in the axial direction which is important above all to the axial guidance of the bearing ring. This second point is of importance above all in the case of rotary drums used for heat-treatment, particularly in the case of a revolving tubular kiln because, in the event of sudden cooling of the drum shell, strong axial forces and stresses occur. In addition, it is necessary in this known construction, too, to remove at least some of the angular retaining elements holding the spacer plates from the furnace mantle for the purpose of replacing spacers; the same applies when the bearing ring has to be replaced. To remove welded-on retaining elements and to refit new ones in this way is not only time consuming and labour-intensive, but also results in undesirable weakening of the drum shell in these fixing zones.

SUMMARY OF THE INVENTION

A principal object of the present invention is to construct a rotary drum of the kind referred to in such a way that the spacer plates can be replaced and the radial clearance changed without having to loosen a retaining element secured to the drum shell.

According to the invention, this object is achieved in that the two retaining elements by which a spacer plate is axially held in position are provided in the region of the same end of that spacer plate, the retaining element which cooperates with the front edge of the spacer plate being arranged on the drum shell and the other retaining element which cooperates with the bearing ring being arranged on the spacer plate.

Whereas, in the last of the known constructions discussed above, angular retaining elements are fixed to the drum shell at both ends of a spacer plate, only one very simple retaining element need be fixed to the drum shell at one end of the spacer plate in the construction according to the invention so that this spacer plate is secured in one axial direction (relative to the drum shell). The second retaining element for axially holding the spacer plate in position is then fixed to the spacer plate itself at the same end thereof on which the retaining element fixed to the drum shell acts, this second retaining element then being fixed to the spacer plate in such a way that it cooperates with that face of the bearing ring situated opposite it. In this way, each spacer plate is secured in both axial directions and the minimum necessary clearance can be maintained. Since, in the construction according to the invention, no retaining element performing an axial retaining function is provided at that end of each spacer plate which faces these two axial retaining elements, the loosely arranged spacer plate is on the one hand able to expand completely freely whilst, on the other hand, the considerable advantage is afforded that, where spacer plates have to be replaced, only that retaining element which is fixed to one end of the spacer plate has to be loosened to be able freely to remove a corresponding spacer plate on the other side. Accordingly, there is no longer any need to remove and refasten a retaining element to the drum shell so that the stability of the furnace mantle is not impaired by repeated replacement of spacer plates. In addition, it is clear that, in the construction according to the invention, spacer plates can be replaced considerably more quickly and with less work than in the known arrangements discussed earlier.

One advantageous embodiment of the invention is characterized in that, where spacer plates are arranged adjacent one another in the peripheral direction of the drum shell, the retaining elements for the axial holding function are provided at opposite ends of the spacer plates. In this way, a loose bearing ring is axially guided and, at the same time, held in position in excellent manner. In one practical further development of the invention, further retaining elements are fixed to the drum shell at either end of each spacer plate on the longitudinal sides thereof for holding the spacer plates in position in the peripheral direction of the drum shell. In this case, it is sufficient to use relatively simple retaining elements which may be fixed to the drum shell with minimal clearance from the associated longitudinal sides of the spacer plate without impairment of the ability of the spacer plate to change length in the axial direction.

In this particular embodiment of the invention, there are basically two possibilities. Firstly, four retaining elements may be fixed to the drum shell (as further retaining elements for keeping the spacer plates in position in the peripheral direction of the drum shell) in such a way that there is enough space between these retaining elements in the associated longitudinal sides of the particular ends of the spacer plates to accommodate operationally induced changes in length of the spacer plate. The second possibility is to design the retaining elements by which the spacer plates are axially held in position on the drum shell and to arrange them in such a way that they simultaneously form the other retaining elements provided at the corresponding ends of the spacer plates for holding them in position in the peripheral direction.

So far as concerns the two retaining elements by which a spacer plate is axially held in position, it is pointed out that, generally, each of these axial retaining elements may even consist of several component elements. In either case, however, these retaining elements are extremely easy to produce.

It is preferred to use welding for fixing all the retaining elements, i.e., for holding a spacer plate in position both in the axial direction and also in the peripheral direction.

DESCRIPTION OF THE DRAWINGS

Examples of the invention are described in detail in the following with reference to the accompanying drawings, wherein:

FIGS. 4 to 8 are diagrammatic plan views of five modifications of the design and arrangement of the loose spacer plates between the drum shell and the bearing ring.

DETAILED DESCRIPTION OF THE INVENTION

Figure 1:
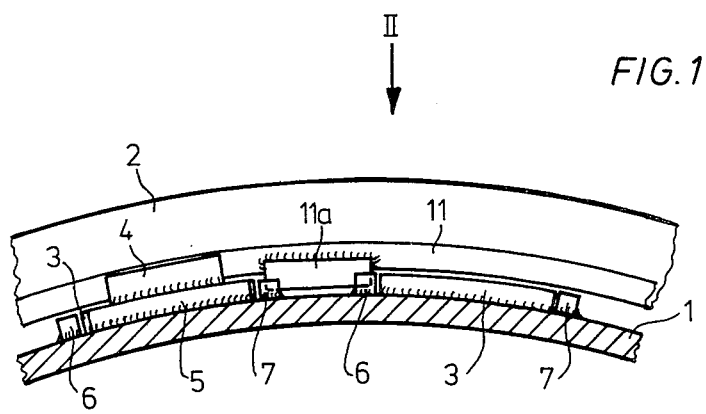
FIG. 1 is a cross section (on the line I—I of FIG. 2) through part of a rotary drum according to the invention in the vicinity of a loose bearing ring.
Figure 3:
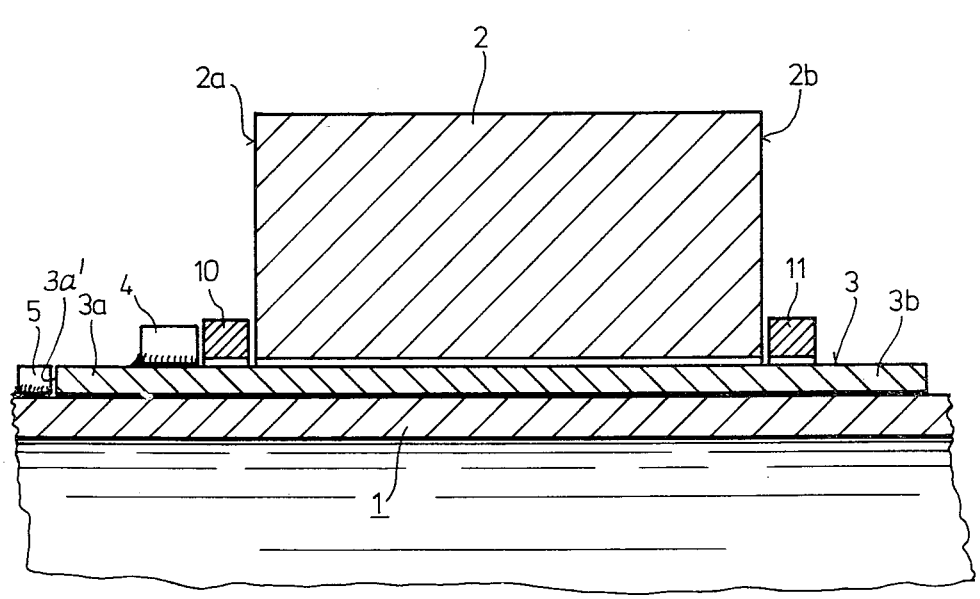
FIG. 3 is a section on the line III—III in FIG. 2.
Figure 2:
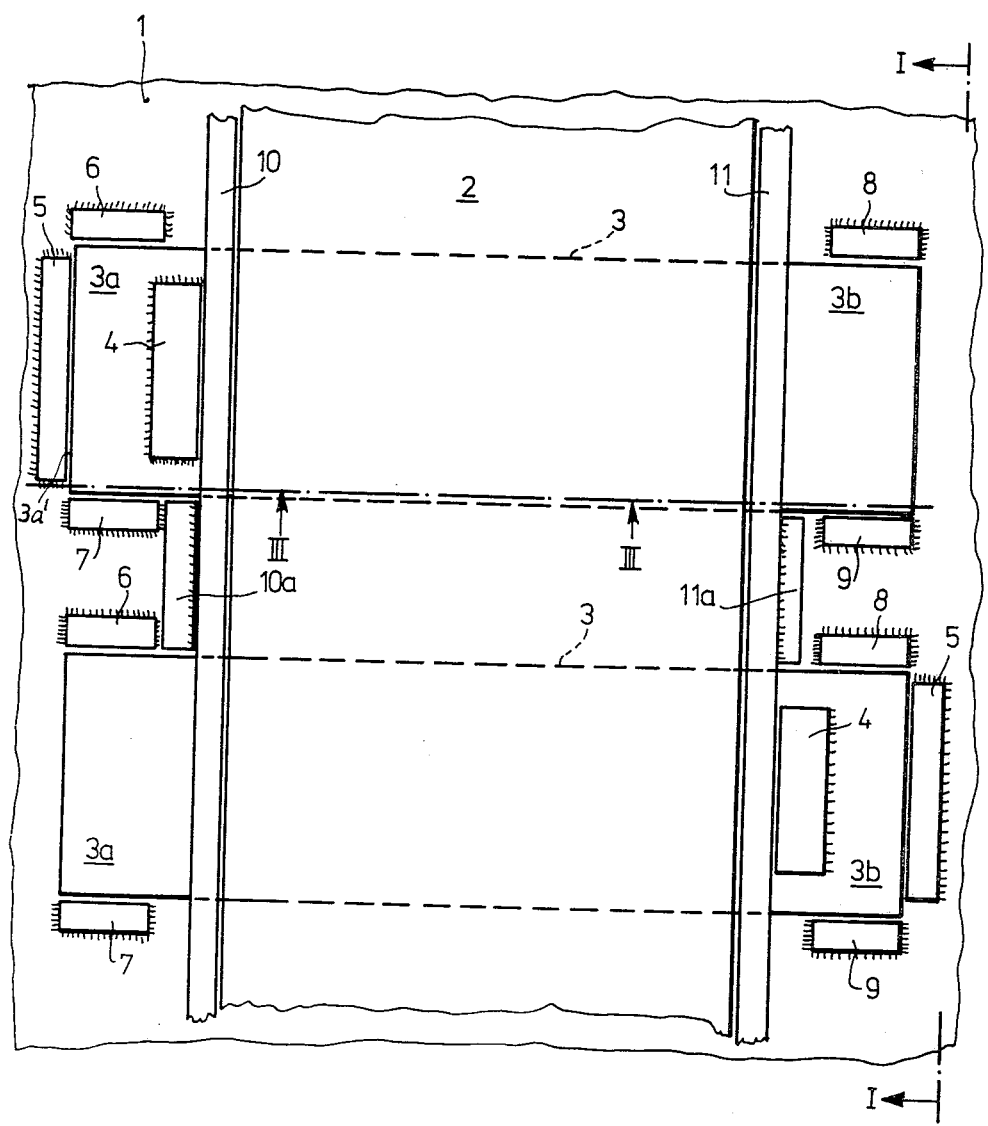
FIG. 2 is a plan view of part of the rotary drum in the region of the bearing ring (see the arrow II in FIG. 1)

A first embodiment of the rotary drum constructed in accordance with the invention is shown in somewhat more detail in FIGS. 1 to 3. Of the drum itself, only part of the cylindrical drum shell 1 has been shown in the interests of simplicity.

Arranged on the outside of the drum shell 1 is a so-called loose bearing ring 2, i.e., this bearing ring 2 has a certain clearance from the drum shell 1 so that it is movable relative to the drum shell 1, particularly in the peripheral direction.

Several loose spacer plates 3 are provided between the drum shell 1 and the bearing ring 2. In the peripheral direction of the drum shell 1, these loose spacer plates 3 are held at equal intervals from one another spaced from the bearing ring 2 both in the axial direction and in the peripheral direction of the drum shell 1 in such a way that they are displaceable to a limited extent relative to the bearing ring 2 and the drum shell 1, particularly in the axial direction. To this end, two retaining elements 4 and 5 for axially holding a spacer plate 3 in position are above all provided at the same end, for example 3a, of the spacer plate (see, in particular, FIGS. 2 and 3). So far as the arrangement of these axial retaining elements 4 and 5 is concerned, it is important for one retaining element 5 to be fixed, preferably welded, to the drum shell 1 in such a way that it faces and cooperates with the front edge, for example 3a', of this end, for example 3a, of the spacer plate, while the other retaining element 4 is fixed, preferably welded, to the upper side of this end, for example 3a, of the spacer plate in such a way that it is able to cooperate with that face 2a of the bearing ring 2 which is situated opposite it. By contrast, that end, for example 3b, of the spacer plate 3 which is opposite the abovementioned end, for example 3a, of the spacer plate is completely free from axial retaining elements so that each spacer plate 3 is able to expand freely in the direction of its axially non-retained end, for example 3b. In this connection, it is pointed out that it is of advantage, where the spacer plates 3 are arranged adjacent one another in the peripheral direction of the drum shell 1, for the axial retaining elements 4, 5 to be respectively arranged at opposite ends of the spacer plates. This can be clearly seen in FIG. 2 where the axial retaining elements 4, 5 of the upper spacer plate 3 (in the drawing) are arranged at the left hand end 3a of the spacer plate and, in the case of the lower, i.e., peripherally adjacent spacer plate 3, at the right hand end 3b of the spacer plate. In this way, the loose bearing ring 2 is also secured particularly favorably with sufficient clearance in the axial direction of the drum shell.

For fixing the loose spacer plates 3, however, it is also of advantage for them to be held in position in the peripheral direction of the drum shell 1 as well. To this end, further retaining elements 6, 7, 8, 9 are fixed to the drum shell 1 at both ends 3a, 3b of each spacer plate 3 (see, in particular, FIG. 2). These further retaining elements 6 to 9 may also be very simply formed by blocks. These four additional retaining elements 6 to 9 for holding the spacer plates 3 in position in the peripheral direction of the drum shell are fixed, preferably welded, to the drum shell 1 in such a way that enough space is present between them and the associated longitudinal sides of the respective ends 3a, 3b of the spacer plate for accommodating operationally induced changes in length of the spacer plates 3 in the peripheral direction, as shown particularly clearly in FIG. 2.

Generally, it is of course possible for the axial retaining elements 4 fixed to the spacer plates 3 directly to cooperate with or abut the faces 2a and 2b of the bearing ring situated opposite them. However, since the bearing ring 2, by virtue of its clearance, moves relatively to the drum shell 1 and, hence, to the spacer plates 3 and the retaining elements 4, it is necessary to minimize the wear occurring through the axial stops on both faces of the bearing ring 2 also on the retaining elements 4. For this reason, it is best to provide stop rings 10 and 11 for both faces 2a, 2b of the bearing ring 2. Each of these stop rings 10 and 11 is arranged between the axial retaining element of each spacer plate 3 which cooperates with the bearing ring 2 and the associated face of the bearing ring and has a distinctly smaller external diameter than the bearing ring 2 and a minimal clearance from the spacer plates 3 (see FIGS. 2 and 3).

To prevent it from turning in the peripheral direction of the drum shell 1, each of the stop rings 10, 11 comprises at least one holding element 10a, 11a, which may be formed by a small plate welded to the stop ring and which engages like a tooth and with clearance between two peripherally adjacent spacer plates 3.

As can be seen in particular from FIG. 3, at least those retaining elements 5 to 9 which are welded to the drum shell 1 may have a height which substantially corresponds to the thickness of the spacer plate 3. It is also possible for all the retaining elements 4 to 9, i.e., including the retaining elements 4 welded onto the spacer plates 3, to be identical in shape, which is particularly advantageous so far as the production and stockkeeping of these retaining elements are concerned.

In the embodiment illustrated in FIGS. 1 to 3, the spacer plates are all equal in size with a rectangular base surface and a uniform thickness (see FIGS. 2 and 3).

In addition to the abovementioned advantages of the construction according to the invention, attention is drawn to another important advantage. If the clearance between the loose bearing ring and the drum shell or the spacer plates has to be reduced, for example because of wear or the like, it is often sufficient in this embodiment according to the invention simply to insert correspondingly thick compensating plates in the axial direction between the drum shell 1 and the spacer plates 3 from that end of the spacer plate which is free from axial retaining elements (4,5). These compensating plates merely have to be welded to the associated spacer plates so that the stability of the drum shell is not adversely affected in this way either. In this case, therefore, the spacer plates 3 never once have to be replaced.

It is of course possible in accordance with the invention to make numerous modifications to the embodiment illustrated in FIGS. 1 to 3. Some further possibilities for the design and arrangement of spacer plates and retaining elements are described in the following with reference to FIGS. 4 to 8 which are highly simplified illustrations. FIGS. 4 to 8 are diagrammatic plan views of only two peripherally adjacent, loose spacer plates with the associated retaining elements, i.e., plan views which are comparable with FIG. 2, except that the drum shell, the bearing ring and the stop rings have been omitted.

In the embodiment illustrated in FIG. 4, the spacer plates 23 may again have a completely rectangular base surface and the same thickness throughout. The main difference between FIG. 4 and the first embodiment illustrated by way of example in FIGS. 1 to 3, lies in the fact that two retaining elements 25 for axially holding the spacer plates 23 in position are provided on the drum shell (not shown), these retaining elements 25 being angular and arranged in such a way that, at the corresponding corners of the associated ends 23a and 23b of the spacer plates, they simultaneously form the peripheral retaining elements provided at these ends 23a and 23b of the spacer plates. Accordingly, the opposite ends 23a and 23b, respectively, of the spacer plates which are free from axial retaining elements may be retained in the same way as in the first embodiment by simple, block-form retaining elements 26, 27 which are associated with the longitudinal sides of the spacer plates 23 at these ends and which are welded to the drum shell.

In the third embodiment illustrated in FIG. 5, the retaining elements 35 fixed to the drum shell for axially holding the spacer plates 33 in position are also simultaneously used (in the same way as in the embodiment illustrated in FIG. 4) for holding the spacer plates 33 in position in the peripheral direction of the drum shell. The two retaining elements 35 provided for this purpose at the corresponding end 33b or 33a of the spacer plate may be in the form of simple blocks and may be arranged obliquely (for example at an angle of 45°) in relation to the associated spacer plate 33, for which purpose its associated end 33b is correspondingly bevelled at its corners in adaptation to these retaining elements 35.

In the embodiments shown in FIG. 6, the spacer plates 43 are again completely rectangular and may again be held in position in the peripheral direction of the drum shell by means of simple retaining elements 46, 47, 48, 49 in the same way as in the embodiment illustrated in FIGS. 1 to 3. The embodiment illustrated in FIG. 6 differs from this first embodiment in that the two retaining elements provided for axially holding a spacer plate 43 in position (at one and the same end, for example 43b, of the spacer plate) are each doubled, i.e., two retaining elements 45a, 45b fixed to the drum shell cooperate with the front edge of the associated end, for example 43b, of the spacer plate, while two retaining elements 44a and 44b fixed to the corresponding end, for example 43b, of the spacer plate cooperate with the bearing ring. This method of fixing is suitable for example for large rotary drums having relatively wide spacer plates.

FIG. 7 shows embodiment in which the spacer plates 53 are somewhat narrower at that end 53b or 53a, where the retaining elements 54, 55 by which the spacer plate 53 is axially held in position are arranged, than the remainder of the spacer plate 53, i.e., only that end which projects below the bearing ring is narrow. In either case, however, the opposite end must be at least as wide as the main part of the spacer plate 53.

As shown in FIG. 8, however, it is also possible for the spacer plates 63 to be designed in such a way that they are widened at their ends 63a and 63b, at least in relation to the section situated below the bearing ring. In this case, the retaining elements 66, 67, 68, 69, which are used for holding the spacer plate 63 in position in the peripheral direction of the drum shell are associated with the longitudinal sides of these widened ends. The retaining elements 64, 65 by which the spacer plates 63 are axially held in position may otherwise be designed and arranged in exactly the same way as in the embodiment illustrated in FIGS. 1 to 3.

The characteristic features of the last two embodiments (FIGS. 7 and 8) lie in the fact that, in these cases, the compensating plates may be inserted particularly effectively below the spacer plates, bearing in mind that the compensating plates are as far as possible required to have the same load-bearing width (below the bearing ring) as the spacer plates themselves.

I claim:

1. In a rotary drum having a bearing ring loosely encircling the drum, a plurality of circumferentially spaced spacer plates loosely arranged between the drum and the bearing ring, holding means reacting between the drum and the spacer plates for limiting movement of the latter circumferentially of the drum, and retaining means for positioning each spacer plate relatively to the drum and the bearing ring, the improvement wherein said retaining means comprise a first retaining element carried by said drum and confronting at least one end of said spacer plate for limiting movement of the latter in the direction of said one end, and a second retaining element carried by said spacer plate adjacent said one end thereof and confronting said ring for limiting movement of the latter in said direction.

2. A rotary drum according to claim 1 wherein the first and second retainer elements associated with alternate spacer plates are arranged at different ends of the latter.

3. A rotary drum according to claim 1 wherein said holding means comprise further retaining elements carried by the drum and flanking said spacer plates.

4. A rotary drum according to claim 3 wherein said further retaining elements comprise blocks adjacent opposite ends of each of said plates.

5. A rotary drum according to claim 3 wherein said further retaining elements are constituted by said first retaining element.

6. A rotary drum according to claim 1 wherein said first retaining element comprises an angular member embracing said one end and the adjacent side of the associated spacer plate.

7. A rotary drum according to claim 1 including a stop ring encircling said drum and said spacer plates and arranged between said bearing ring and said second retaining element, with clearance between said spacer plates and said stop ring, said stop ring having an external diameter less than that of said bearing ring.

8. A rotary drum according to claim 7 including a holding member interposed tooth-like between two adjacent spacer plates and engageable with said stop ring.

9. A rotary drum according to claim 1 wherein each of said retaining elements carried by said drum has a height corresponding substantially to that of the associated spacer plate.

10. A rotary drum according to claim 1 wherein at least that portion of each spacer plate underlying said bearing ring has a substantially rectangular base surface and a uniform thickness.

11. A rotary drum according to claim 1 wherein said spacer plates are wider at their ends than elsewhere and said holding means are associated with the ends of said spacer plates.

12. A rotary drum according to claim 1 wherein each of said spacer plates is narrower at said one end than elsewhere.

* * * * *